(12) United States Patent
Shin et al.

(10) Patent No.: US 12,452,558 B2
(45) Date of Patent: Oct. 21, 2025

(54) IMAGE SENSOR AND OPERATING METHOD THEREOF

(71) Applicant: SK hynix Inc., Gyeonggi-do (KR)

(72) Inventors: Jung Soon Shin, Gyeonggi-do (KR);
Seong Hee Park, Gyeonggi-do (KR);
Ki Young Kim, Gyeonggi-do (KR);
Jong Eun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 233 days.

(21) Appl. No.: 18/460,587

(22) Filed: Sep. 4, 2023

(65) Prior Publication Data
US 2024/0323567 A1 Sep. 26, 2024

(30) Foreign Application Priority Data

Mar. 22, 2023 (KR) .................. 10-2023-0037301

(51) Int. Cl.
| | |
|---|---|
| H04N 25/771 | (2023.01) |
| G06F 17/16 | (2006.01) |
| H04N 25/77 | (2023.01) |
| H04N 25/779 | (2023.01) |
| H04N 25/78 | (2023.01) |
| H04N 25/79 | (2023.01) |
| H10F 39/00 | (2025.01) |

(52) U.S. Cl.
CPC ........... *H04N 25/771* (2023.01); *G06F 17/16* (2013.01); *H04N 25/77* (2023.01); *H04N 25/779* (2023.01); *H04N 25/78* (2023.01); *H04N 25/79* (2023.01); *H10F 39/809* (2025.01)

(58) Field of Classification Search
CPC ...... H04N 25/70; H04N 25/77; H04N 25/771; H04N 25/772; H04N 25/779; H04N 25/78; H04N 25/79; H10F 39/809; G06F 3/0659; G06F 17/16; G06F 17/153; G06N 3/065
See application file for complete search history.

(56) References Cited

U.S. PATENT DOCUMENTS

| | | | |
|---|---|---|---|
| 8,988,571 B2* | 3/2015 | Sugawa | H04N 25/771 |
| | | | 348/308 |
| 2003/0206236 A1* | 11/2003 | Levantovsky | H04N 25/78 |
| | | | 348/E3.018 |
| 2020/0119028 A1 | 4/2020 | Tran et al. | |
| 2020/0128168 A1 | 4/2020 | Ichimaru et al. | |

(Continued)

OTHER PUBLICATIONS

Gourav Datta et al., P2M: A Processing-in-Pixel-in-Memory Paradigm for Resource-Constrained TinyML Applications, arXiv, Mar. 17, 2022, pp. 1-15, 2203.04737v2 [cs.LG].

(Continued)

*Primary Examiner* — Lin Ye
*Assistant Examiner* — Chriss S Yoder, III
(74) *Attorney, Agent, or Firm* — IP & T GROUP LLP

(57) ABSTRACT

Disclosed is an image sensor including a plurality of column lines, a plurality of pixels coupled to the plurality of column lines, and configured to output a plurality of pixel signals to the plurality of column lines in response to first control signals, and a plurality of memory cells coupled to the plurality of column lines, and configured to output a plurality of convolution signals, in which a plurality of data signals are reflected in the plurality of pixel signals, to the plurality of column lines in response to second control signals.

19 Claims, 7 Drawing Sheets

(56) References Cited

U.S. PATENT DOCUMENTS

2024/0021242 A1* 1/2024 Park ................... G11C 13/0026
2025/0048004 A1* 2/2025 Hanzawa ............... H04N 25/79

OTHER PUBLICATIONS

Shimeng Yu et al., Compute-in-Memory Chips for Deep Learning: Recent Trends and Prospects, IEEE Circuits and Systems Magazine, Third Quarter, 2021, pp. 31-56.
T. Patrick Xiao et al., Analog architectures for neural network acceleration based on non-volatile memory, Applied Physics Reviews, Jul. 9, 2020, pp. 031301-1-34, AIP Publishing.

* cited by examiner

IMAGE SENSOR AND OPERATING METHOD THEREOF

CROSS-REFERENCE TO RELATED APPLICATION(S)

This application claims priority under 35 U.S.C. § 119 to Korean Patent Application No. 10-2023-0037301, filed on Mar. 22, 2023, the disclosure of which is incorporated herein by reference in its entirety.

BACKGROUND

1. Field

Various embodiments of the present disclosure relate to a semiconductor design technique, and more particularly, to an image sensor to which analog computing-in-memory (ACiM) technology is applied, and an operating method thereof.

2. Description of the Related Art

With the development of technology such as artificial intelligence (AI), big data, and edge computing, demands for electronic devices to process large-capacity data faster have emerged. For example, as large-capacity data processing is required in an artificial intelligence processing method such as deep learning, overhead for power and delay occurring in memory data access and transfer is increasing above overhead for power and delay occurring in computing. In order to reduce the overhead, analog computing-in-memory (ACiM) technology for performing calculations in a memory has been proposed, and many studies are currently being conducted.

Meanwhile, the electronic devices may each include image sensors. Image sensors are devices for capturing images using the property of a semiconductor which reacts to light. Image sensors may be classified into charge-coupled device (CCD) image sensors and complementary metal-oxide semiconductor (CMOS) image sensors. Recently, CMOS image sensors are widely used because the CMOS image sensors can allow both analog and digital control circuits to be directly implemented on a single integrated circuit (IC).

SUMMARY

Various embodiments of the present disclosure are directed to an image sensor to which analog computing-in-memory (ACIM) technology is applied, and an operating method thereof.

In accordance with an embodiment of the present disclosure, an image sensor may include: a plurality of column lines; a plurality of pixels coupled to the plurality of column lines, and configured to output a plurality of pixel signals to the plurality of column lines in response to first control signals; and a plurality of memory cells coupled to the plurality of column lines, and configured to output a plurality of convolution signals, in which a plurality of data signals are reflected in the plurality of pixel signals, to the plurality of column lines in response to second control signals.

In accordance with an embodiment of the present disclosure, an image sensor may include: a first die including a pixel array and a memory cell array; and a second die stacked at a top or bottom of the first die, and configured to generate first control signals for controlling the pixel array and second control signals for controlling the memory cell array, and process a plurality of pixel signals generated by the pixel array and a plurality of convolution signals generated by the memory cell array.

In accordance with an embodiment of the present disclosure, an operating method of an image sensor may include: reading out a plurality of pixel signals in response to first control signals; converting the plurality of pixel signals into a plurality of first digital signals; generating second control signals based on the plurality of first digital signals; generating a plurality of convolution signals, in which a plurality of weights are reflected in the plurality of pixel signals, in response to the second control signals; and converting the plurality of convolution signals into a plurality of second digital signals.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 1:
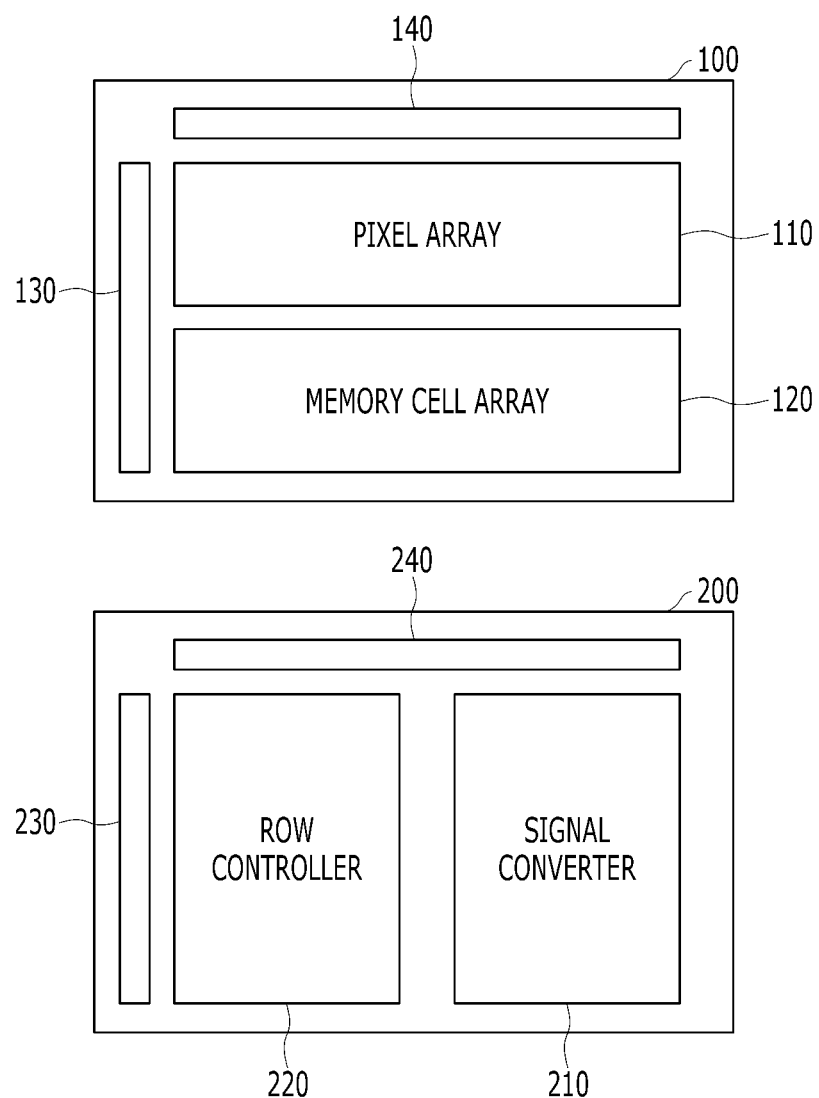
FIG. 1 is a block diagram illustrating an image sensor in accordance with an embodiment of the present disclosure.

FIG. 1 is a block diagram illustrating an image sensor in accordance with an embodiment of the present disclosure.

Referring to FIG. 1, the image sensor may include a first die 100 and a second die 200.

The first die 100 may generate a plurality of pixel signals in response to first control signals. The first die 100 may generate a plurality of convolution signals in response to second control signals. For example, the first die 100 may include a pixel array 110, a memory cell array 120, a first control region 130, and a first readout region 140.

The pixel array 110 may include a plurality of pixels. The plurality of pixels may generate the plurality of pixel signals in response to the first control signals. The plurality of pixels may be coupled to a plurality of column lines. The plurality of pixel signals may be outputted through the plurality of column lines during a plurality of readout periods.

The memory cell array 120 may include a plurality of memory cells. The plurality of memory cells may store a plurality of data signals. For example, each of the plurality of data signals may include a weight assigned to a corresponding pixel. The weight may be information learned according to an artificial intelligence processing method such as deep learning. The plurality of memory cells may generate the plurality of convolution signals in response to the second control signals. The plurality of convolution signals may be signals in which the plurality of data signals are reflected in (i.e., applied to) the plurality of pixel signals. The plurality of memory cells may be coupled to the plurality of column lines. The plurality of convolution signals may be outputted through the plurality of column lines during a plurality of convolution periods. The plurality of convolution periods may be subsequent to the plurality of readout periods, respectively. That is, the plurality of readout periods and the plurality of convolution periods may be present alternately by one period.

The first control region 130 may transmit the first control signals to the pixel array 110 and the second control signals to the memory cell array 120.

The first readout region 140 may transmit the plurality of pixel signals and the plurality of convolution signals to the second die 200.

The second die 200 may be stacked at a top or bottom of the first die 100. The second die 200 may generate the first control signals for controlling an operation of the pixel array 110. The second die 200 may generate the second control signals for controlling an operation of the memory cell array 120. The second die 200 may process the plurality of pixel signals generated by the pixel array 110 and the plurality of convolution signals generated by the memory cell array 120. For example, the second die 200 may include a signal converter 210, a row controller 220, a second control region 230, and a second readout region 240.

The signal converter 210 may convert the plurality of pixel signals generated by the pixel array 110 into a plurality of first digital signals. The signal converter 210 may convert the plurality of convolution signals generated by the memory cell array 120 into a plurality of second digital signals. For example, the signal converter 210 may include a plurality of analog to digital converters. The plurality of analog to digital converters may be coupled to the plurality of column lines through the second readout region 240 and the first readout region 140.

The row controller 220 may generate the first control signals. The first control signals may include control signals, for example, TX0, TX1, RX0, and SX0, for controlling the pixel array 110 for each row (refer to FIG. 2). The row controller 220 may generate the second control signals on the basis of the plurality of first digital signals. The second control signals may include control signals, for example, VL0 and VL1, for controlling the memory cell array 120 for each row and control signals, for example, EN0 and EN1, for controlling the memory cell array 120 for each column (refer to FIG. 2). In particular, among the second control signals, the control signals, for example, VL0 and VL1, may have digital values corresponding to the plurality of pixel signals, respectively.

The second control region 230 may transmit the first control signals and the second control signals to the first control region 130. The second control region 230 and the first control region 130 may be electrically coupled to each other through a plurality of through-silicon vias or a plurality of hybrid bonding. The first control signals and the second control signals may be transmitted from the second control region 230 to the first control region 130 through corresponding through-silicon vias or corresponding hybrid bonding.

The second readout region 240 may transmit the plurality of pixel signals and the plurality of convolution signals to the signal converter 210. The second readout region 240 and the first readout region 140 may be electrically coupled to each other through a plurality of through-silicon vias or a plurality of hybrid bonding. The plurality of pixel signals and the plurality of convolution signals may be transmitted from the first control region 130 to the second control region 230 corresponding through through-silicon vias or corresponding hybrid bonding.

Figure 2:
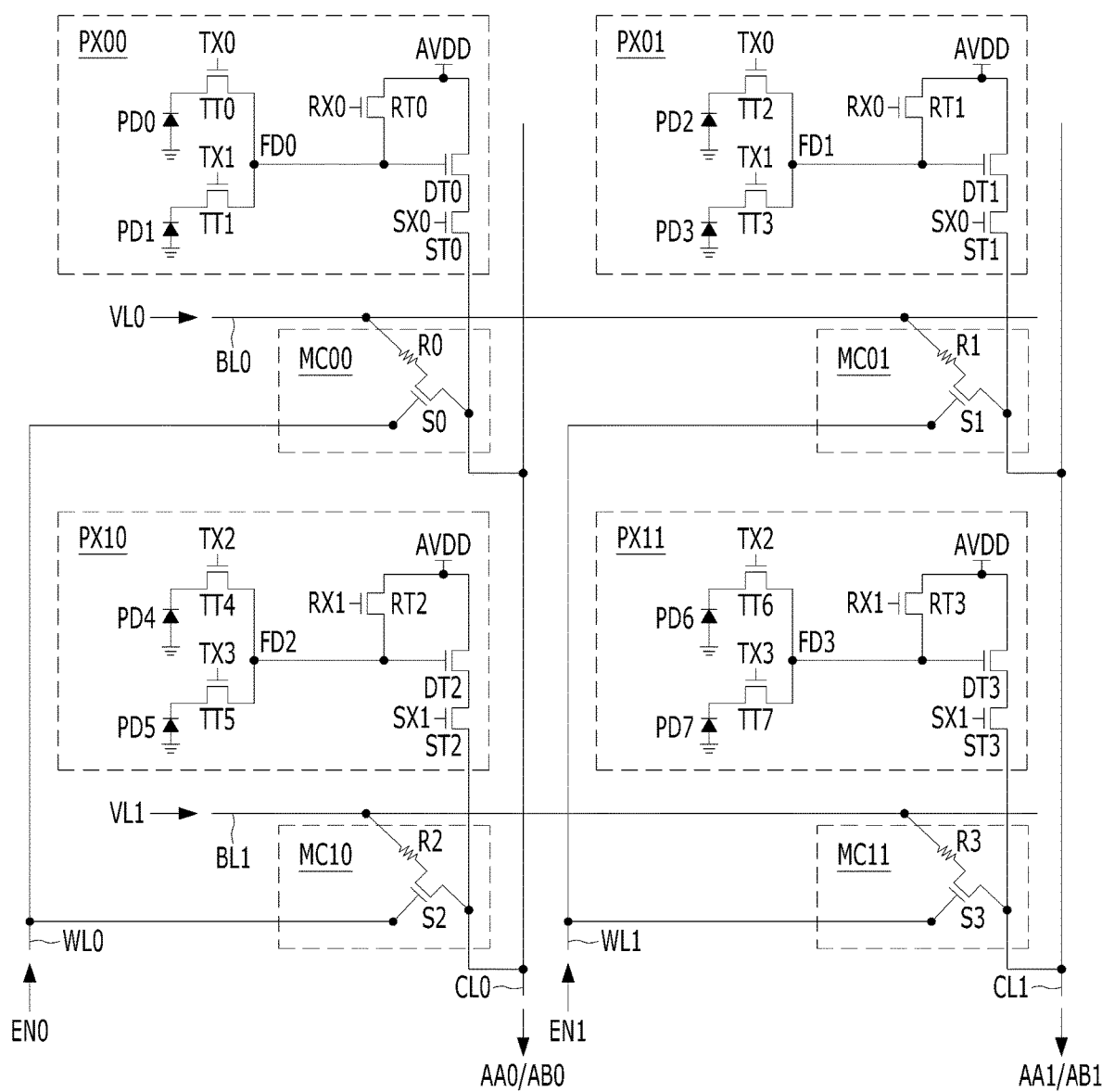
FIG. 2 is a circuit diagram illustrating an example of a pixel array and a memory cell array illustrated in FIG. 1.

FIG. 2 is a circuit diagram illustrating an example of the pixel array 110 and the memory cell array 120 illustrated in FIG. 1. For example, FIG. 2 illustrates just a portion of the pixel array 110 and a portion of the memory cell array 120.

Referring to FIG. 2, the pixel array 110 may include first to fourth pixels PX00, PX01, PX10, and PX11 arranged in a row direction and a column direction. For example, the first and second pixels PX00 and PX01 may be arranged in a first row, and the third and fourth pixels PX10 and PX11 may be arranged in a second row. In addition, the first and third pixels PX00 and PX10 may be arranged in a first column, and the second and fourth pixels PX01 and PX11 may be arranged in a second column.

The first pixel PX00 may include first and second photodiodes PD0 and PD1, first and second transmission elements TT0 and TT1, a first reset element RT0, a first floating diffusion node FD0, a first driving element DT0, and a first selection element ST0. The first and second photodiodes PD0 and PD1 and the first and second transmission elements TT0 and TT1 may share the first reset element RT0, the first driving element DT0 and the first selection element ST0 through the first floating diffusion node FD0. Although it is described as an example in the present embodiment that a pixel includes two photodiodes, that is, PD0 and PD1, and two transmission elements, that is, TT0 and TT1, the present disclosure is not necessarily limited thereto, and a pixel may include one photodiode and one transmission element, or include three or more photodiodes and three or more transmission elements.

The first and second photodiodes PD0 and PD1 may be coupled between a supply terminal of a low voltage and the first and second transmission elements TT0 and TT1, respectively. The first and second photodiodes PD0 and PD1 may generate charges corresponding to respective inputted light, that is, incident light.

The first and second transmission elements TT0 and TT1 may be coupled between the first and second photodiodes PD0 and PD1, respectively, and the first floating diffusion node FD0. The first and second transmission elements TT0 and TT1 may selectively couple the first and second photodiodes PD0 and PD1 to the first floating diffusion node FD0 in response to first and second transmission control signals TX0 and TX1, respectively.

The first reset element RT0 may be coupled between a supply terminal of a high voltage AVDD and the first floating diffusion node FD0. The first reset element RT0 may selectively couple the supply terminal of the high voltage AVDD to the first floating diffusion node FD0 in response to a first reset control signal RX0.

The first floating diffusion node FD0 may store charges transmitted from at least one of the first and second photodiodes PD0 and PD1. For example, a parasitic capacitor (not illustrated) capable of storing the charges may be coupled to the first floating diffusion node FD0.

The first driving element DT0 may be coupled between the first floating diffusion node FD0, the supply terminal of the high voltage AVDD and the first selection element ST0. The first driving element DT0 may generate a first pixel signal AA0 by using the high voltage AVDD on the basis of a voltage loaded onto the first floating diffusion node FD0.

The first selection element ST0 may be coupled between the first driving element DT0 and a first column line CL0. The first selection element ST0 may be enabled during a first readout period in response to a first selection control signal SX0, and output the first pixel signal AA0 through the first column line CL0.

Since the second pixel PX01 has the same configuration as the first pixel PX00, a detailed description of the second pixel PX01 is omitted. However, as the second pixel PX01 is arranged in the same row, that is, the first row, as the first pixel PX00, the second pixel PX01 may be controlled in response to the same control signals TX0, TX1, RX0, and SX0, and may be enabled during the first readout period and output a second pixel signal AA1 through a second column line CL1.

The third pixel PX10 may include fifth and sixth photodiodes PD4 and PD5, fifth and sixth transmission elements TT4 and TT5, a third reset element RT2, a third floating diffusion node FD2, a third driving element DT2, and a third selection element ST2. The fifth and sixth photodiodes PD4 and PD5 and the fifth and sixth transmission elements TT4 and TT5 may share the third reset element RT2, the third driving element DT2 and the third selection element ST2 through the third floating diffusion node FD2. Although it is described as an example in the present embodiment that a pixel includes two photodiodes, that is, PD4 and PD5, and two transmission elements, that is, TT4 and TT5, the present disclosure is not necessarily limited thereto, and a pixel may include one photodiode and one transmission element, or include three or more photodiodes and three or more transmission elements.

The fifth and sixth photodiodes PD4 and PD5 may be coupled between the supply terminal of the low voltage and the fifth and sixth transmission elements TT4 and TT5, respectively. The fifth and sixth photodiodes PD4 and PD5 may generate charges corresponding to respective inputted light, that is, incident light.

The fifth and sixth transmission elements TT4 and TT5 may be coupled between the fifth and sixth photodiodes PD4 and PD5, respectively, and the third floating diffusion node FD2. The fifth and sixth transmission elements TT4 and TT5 may selectively couple the fifth and sixth photodiodes PD4 and PD5 to the third floating diffusion node FD2 in response to fifth and sixth transmission control signals TX4 and TX5, respectively.

The third reset element RT2 may be coupled between the supply terminal of the high voltage AVDD and the third floating diffusion node FD2. The third reset element RT2 may selectively couple the supply terminal of the high voltage AVDD to the third floating diffusion node FD2 in response to a second reset control signal RX1.

The third floating diffusion node FD2 may store charges transmitted from at least one of the fifth and sixth photodiodes PD4 and PD5. For example, a parasitic capacitor (not illustrated) capable of storing the charges may be coupled to the third floating diffusion node FD2.

The third driving element DT2 may be coupled between the third floating diffusion node FD2, the supply terminal of the high voltage AVDD and the third selection element ST2. The third driving element DT2 may generate the first pixel signal AA0 by using the high voltage AVDD on the basis of a voltage loaded onto the third floating diffusion node FD2.

The third selection element ST2 may be coupled between the third driving element DT2 and the first column line CL0. The third selection element ST2 may be enabled during a second readout period in response to a second selection control signal SX1, and output the first pixel signal AA0 through the first column line CL0. The second readout period may be subsequent to the first readout period.

Since the fourth pixel PX11 has the same configuration as the third pixel PX10, a detailed description of the fourth pixel PX11 is omitted. However, as the fourth pixel PX11 is arranged in the same row, that is, the second row, as the third pixel PX10, the fourth pixel PX11 may be controlled in response to the same control signals TX2, TX3, RX1, and SX1, and may be enabled during the second readout period and output the second pixel signal AA1 through the second column line CL1.

The memory cell array 120 may include first to fourth memory cells MC00, MC01, MC10, and MC11 arranged in the row direction and the column direction. For example, the first and second memory cells MC00 and MC01 may be arranged in the first row, and the third and fourth memory cells MC10 and MC11 may be arranged in the second row. In addition, the first and third memory cells MC00 and MC10 may be arranged in the first column, and the second and fourth memory cells MC01 and MC11 may be arranged in the second column.

The first memory cell MC00 may be coupled to a first bit line BL0, a first word line WL0 and the first column line CL0. The first memory cell MC00 may store a first data signal therein in a test mode. In a normal mode, the first memory cell MC00 may generate a first convolution signal AB0 through the first column line CL0 during at least a first convolution period. The first convolution period may be present between the first readout period and the second readout period. The first memory cell MC00 may include a first switch element S0 and a first resistive memory element R0.

The first resistive memory element R0 may be coupled between the first bit line BL0 and the first switch element S0. The first resistive memory element R0 may have a first resistance value corresponding to a first weight. The first weight may be a fixed value which is predetermined through learning. The first resistance value may be written in the test mode. For example, the first resistance value may be set according to a voltage level of a first bit line control signal VL0 inputted through the first bit line BL0.

The first switch element S0 may be coupled to the first resistive memory element R0, the first word line WL0 and the first column line CL0. The first switch element S0 may be enabled or disabled in response to a first word line control signal EN0 inputted through the first word line WL0. For example, when the first switch element S0 is enabled, the first bit line BL0 may be electrically connected to the first resistive memory element R0, and when the first switch element S0 is disabled, the first bit line BL0 may be electrically disconnected from the first resistive memory element R0.

Since the second to fourth memory cells MC01, MC10 and MC11 each have the same configuration as the first memory cell MC00, detailed descriptions of the second to fourth memory cells MC01, MC10 and MC11 are omitted. However, the second memory cell MC01 may be coupled to the first bit line BL0, a second word line WL1 and the second column line CL1, the third memory cell MC10 may be coupled to a second bit line BL1, the first word line WL0 and the first column line CL0, and the fourth memory cell MC11 may be coupled to the second bit line BL1, the second word line WL1 and the second column line CL1.

The pixel array 110 and the memory cell array 120 may share the plurality of column lines. For example, the first pixel PX00, the first memory cell MC00, the third pixel PX10 and the third memory cell MC10 may share the first column line CL0, and the second pixel PX01, the second memory cell MC01, the fourth pixel PX11 and the fourth memory cell MC11 may share the second column line CL1.

Figure 3:
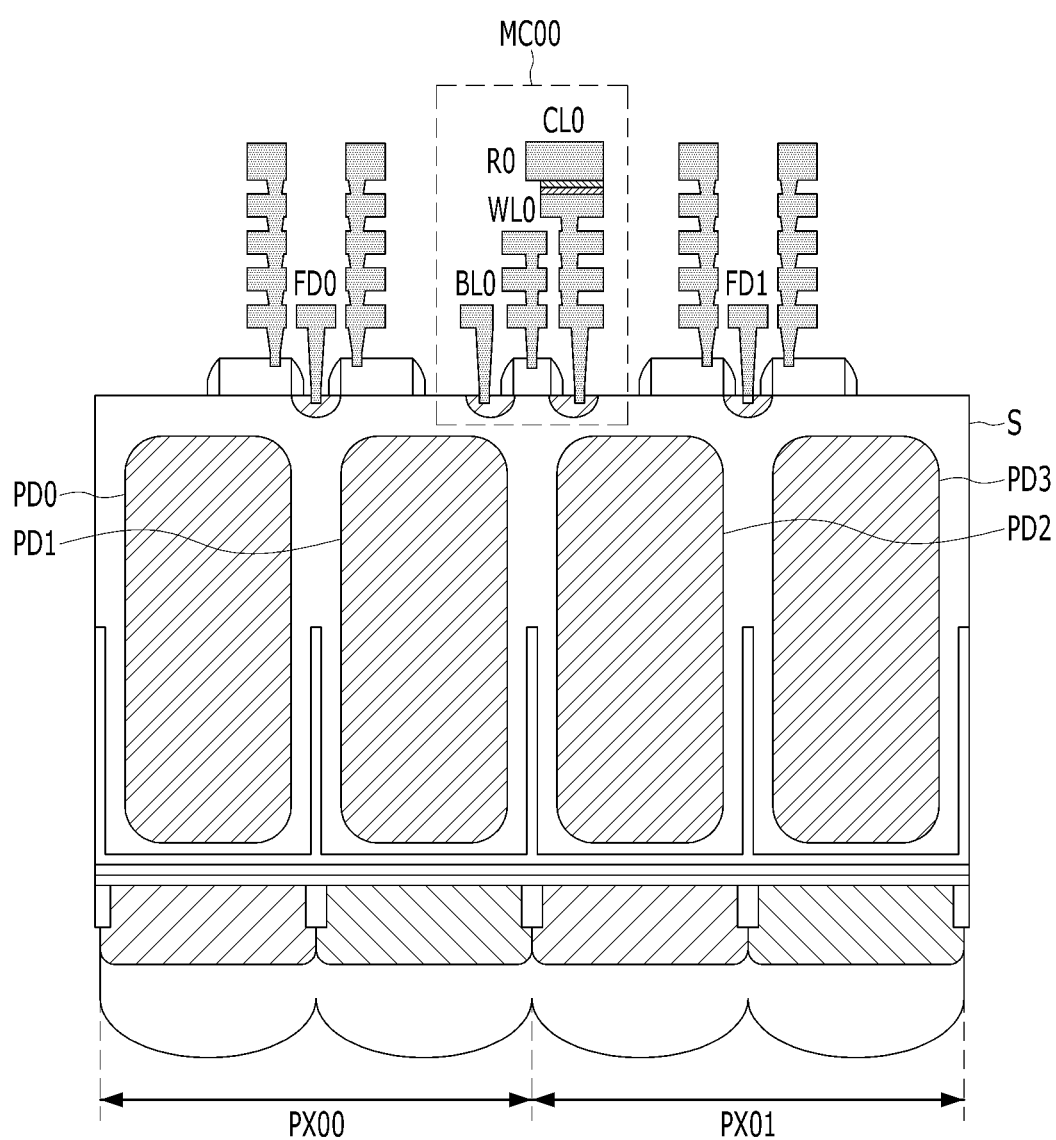
FIG. 3 is a cross-sectional diagram for further describing the pixel array and the memory cell array illustrated in FIG. 2.

FIG. 3 is a cross-sectional diagram for further describing the pixel array 110 and the memory cell array 120 illustrated in FIG. 2.

Referring to FIG. 3, the first pixel PX00 may be configured in a first region. The second pixel PX01 may be formed in a second region. The first memory cell MC00 may be configured in a third region between the first region and the second region. The third region may overlap with a portion of the first region and overlap with a portion of the second region in a plan view. That is, the third region may be disposed on a boundary line between the first region and the second region. The third region may be disposed over or under a substrate S in which the photodiodes PD0, PD1, PD2 and PD3 are formed.

Figure 4:
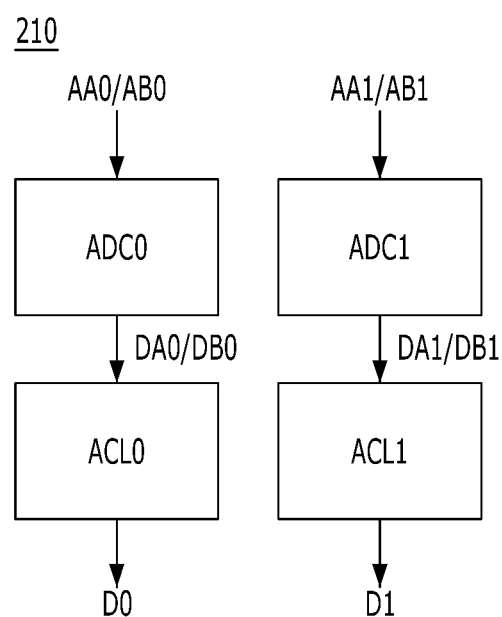
FIG. 4 is a block diagram illustrating an example of a signal converter illustrated in FIG. 1.

FIG. 4 is a block diagram illustrating an example of the signal converter 210 illustrated in FIG. 1. In FIG. 4, only a portion of the signal converter 210 is illustrated.

Referring to FIG. 4, the signal converter 210 may include a first conversion circuit ADC0, a first accumulation circuit ACL0, a second conversion circuit ADC1, and a second accumulation circuit ACL1.

The first conversion circuit ADC0 may generate a first digital signal DA0 on the basis of the first pixel signal AA0 during the plurality of readout periods, and generate a second digital signal DB0 on the basis of the first convolution signal AB0 during the plurality of convolution periods. For example, the first conversion circuit ADC0 may convert the first pixel signal AA0 of the first pixel PX00 into the first digital signal DA0 during the first readout period, and convert the first convolution signal AB0 of the first memory cell MC00 into the second digital signal DB0 during the first convolution period. In particular, the first conversion circuit ADC0 may generate the second digital signal DB0 by a predetermined number of times according to the first convolution signal AB0 inputted by the predetermined number of times during the first convolution period. The predetermined number of times may correspond to bit depth of the first digital signal DA0.

The first accumulation circuit ACL0 may generate a first accumulation signal D0 on the basis of the second digital signal DB0 during the plurality of convolution periods. For example, the first accumulation circuit ACL0 may accumulate, that is, add up the second digital signal DB0, which is inputted by the predetermined number of times, according to a predetermined scheme during the first convolution period, thereby generating the first accumulation signal D0 (refer to FIG. 7).

The second conversion circuit ADC1 may generate a third digital signal DA1 on the basis of the second pixel signal AA1 during the plurality of readout periods, and generate a fourth digital signal DB1 on the basis of a second convolution signal AB1 during the plurality of convolution periods. For example, the second conversion circuit ADC1 may convert the second pixel signal AA1 of the second pixel PX01 into the third digital signal DA1 during the first readout period, and convert the second convolution signal AB1 of the second memory cell MC01 into the fourth digital signal DB1 during the first convolution period. In particular, the second conversion circuit ADC1 may generate the fourth digital signal DB1 by a predetermined number of times according to the second convolution signal AB1, which is inputted by the predetermined number of times, during the first convolution period. The predetermined number of times may correspond to bit depth of the third digital signal DA1.

The second accumulation circuit ACL1 may generate a second accumulation signal D1 on the basis of the fourth digital signal DB1 during the plurality of convolution periods. For example, the second accumulation circuit ACL1 may accumulate, that is, add up the fourth digital signal DB1, which is inputted by the predetermined number of times, according to a predetermined scheme during the second convolution period, thereby generating the second accumulation signal D1 (refer to FIG. 7).

Figure 5:
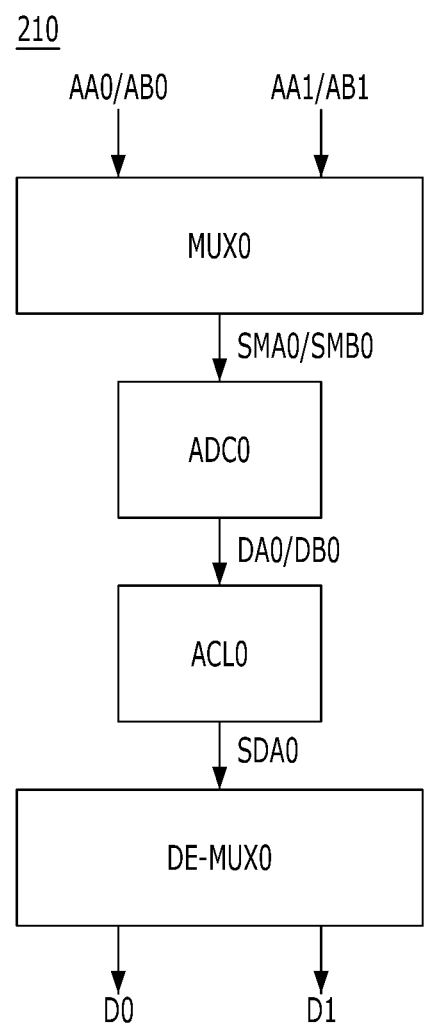
FIG. 5 is a block diagram illustrating another example of the signal converter illustrated in FIG. 1.

FIG. 5 is a block diagram illustrating another example of the signal converter 210 illustrated in FIG. 1. In FIG. 5, only a portion of the signal converter 210 is illustrated.

Referring to FIG. 5, the signal converter 210 may include a selection circuit MUX0, a conversion circuit ADC0, an accumulation circuit ACL0, and a distribution circuit DEMUX0.

During the plurality of readout periods, the selection circuit MUX0 may receive the first pixel signal AA0 and the second pixel signal AA1, and sequentially generate the first pixel signal AA0 and the second pixel signal AA1 as a first selection signal SMA0. For example, during the first readout period, the selection circuit MUX0 may output the first pixel signal AA0 as the first selection signal SMA0, and then output the second pixel signal AA1 as the first selection signal SMA0.

During the plurality of convolution periods, the selection circuit MUX0 may receive the first convolution signal AB0 and the second convolution signal AB1, and sequentially generate the first convolution signal AB0 and the second convolution signal AB1 as a second selection signal SMB0. For example, during the first convolution period, the selection circuit MUX0 may output the first convolution signal AB0 as the second selection signal SMB0, and then output the second convolution signal AB1 as the second selection signal SMB0.

The conversion circuit ADC0 may generate a first digital signal DA0 in response to the first selection signal SMA0 during the plurality of readout periods, and generate a second digital signal DB0 in response to the second selection signal SMB0 during the plurality of convolution periods. For example, during the first readout period, the conversion circuit ADC0 may generate the first digital signal DA0 in response to the first selection signal SMA0 corresponding to the first pixel signal AA0, and then generate the first digital signal DA0 in response to the first selection signal SMA0 corresponding to the second pixel signal AA1. In addition, during the first convolution period, the conversion circuit ADC0 may generate the second digital signal DB0 in response to the second selection signal SMB0 corresponding to the first convolution signal AB0, and then generate the second convolution signal DB0 in response to the second selection signal SMB0 corresponding to the second convolution signal AB1. In particular, during the first convolution period, the conversion circuit ADC0 may generate the second digital signal DB0 by a predetermined number of times according to the first convolution signal AB0 inputted by the predetermined number of times, and generate the second digital signal DB0 by the predetermined number of times according to the second convolution signal AB1 inputted by the predetermined number of times. The predetermined number of times may correspond to bit depth of the first digital signal DA0.

The accumulation circuit ACL0 may generate an accumulation signal SDA0 on the basis of the second digital signal DB0 during the plurality of convolution periods. For example, the accumulator circuit ACL0 may accumulate, that is, add up the second digital signal DB0, which is inputted by the predetermined number of times, according to a predetermined scheme during the first convolution period, thereby sequentially generating the accumulation signal SDA0 corresponding to the first convolution signal AB0 and the accumulation signal SDA0 corresponding to the second convolution signal AB1.

The distribution circuit DE-MUX0 may sequentially generate a first accumulation signal D0 and a second accumulation signal D1 on the basis of the accumulation signal SDA0 during the plurality of convolution periods. For example, during the first convolution period, the distribution circuit DE-MUX0 may generate the first accumulation signal D0 corresponding to the first convolution signal AB0, and then sequentially generate the second accumulation signal D1 corresponding to the second convolution signal AB1.

Hereinafter, an operation of the image sensor in accordance with an embodiment of the present disclosure, which has the above-described configuration, is described with reference to FIGS. 6 and 7.

First, an operation of the image sensor in the test mode is described.

The row controller 220 may sequentially select a plurality of memory cells included in the memory cell array 120, and write respective data signals to the selected memory cells. For example, the row controller 220 may select the first memory cell MC00 included in the memory cell array 120, and write a first data signal to the first memory cell MC00. The first data signal may include a first weight assigned to the first pixel PX00. The weight may be information learned according to an artificial intelligence processing method such as deep learning.

The row controller 220 may generate the second control signals for sequentially selecting the plurality of memory cells. For example, when the row controller 220 activates the first word line control signal EN0 and the first bit line control signal VL0, the first memory cell MC00 among memory cells in the first column may be selected. In this case, the row controller 220 may determine a level of the first data signal, that is, the first weight, by controlling a voltage level of the first bit line control signal VL0.

Next, an operation of the image sensor in the normal mode is described.

Figure 6:
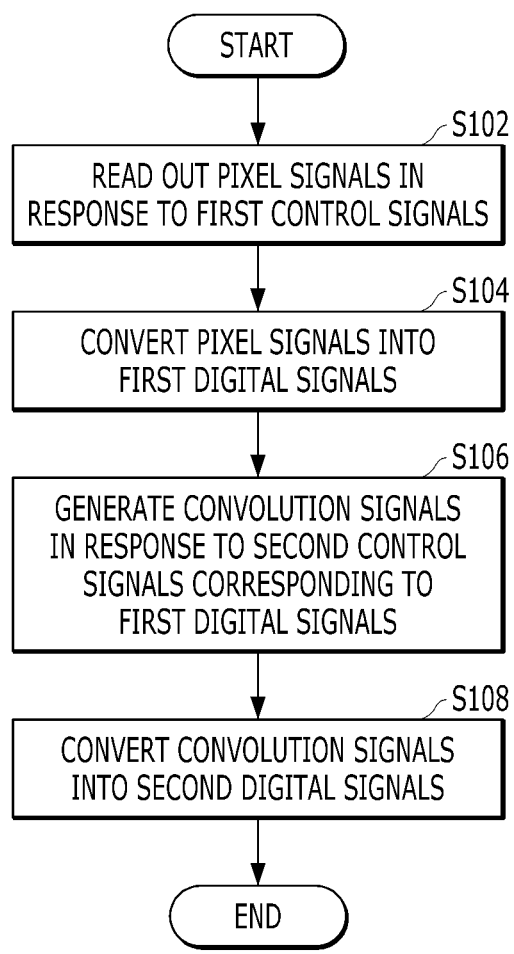
FIG. 6 is a flowchart for describing an operation of an image sensor in a normal mode in accordance with an embodiment of the present disclosure.

FIG. 6 is a flowchart for describing an operation of the image sensor in the normal mode in accordance with an embodiment of the present disclosure.

Referring to FIG. 6, the pixel array 110 may read out a plurality of pixel signals corresponding to incident light, in response to the first control signals, in operation S102. The first control signals may be generated by the row controller 220, and be transmitted to the pixel array 110 through the first and second control regions 130 and 230. For example, the first control signals may include the first and second transmission control signals TX0 and TX1, the first reset control signal RX0, and the first selection control signal SX0 (refer to FIG. 2). The plurality of pixel signals may be outputted through a plurality of column lines. For example, the first pixel signal AA0 may be outputted through the first column line CL0, and the second pixel signal AA1 may be outputted through the second column line CL1.

The signal converter 210 may convert the plurality of pixel signals into a plurality of digital signals in operation S104. The plurality of pixel signals may be transmitted to the signal converter 210 through the first and second readout regions 140 and 240. For example, the signal converter 210 may convert the first pixel signal AA0 into the first digital signal DA0, and convert the second pixel signal AA1 into the third digital signal DA1 (refer to FIG. 4). The signal converter 210 may sequentially transmit the plurality of digital signals to the row controller 220. For example, the signal converter 210 may transmit the first digital signal DA0 to the row controller 220, and then transmit the third digital signal DA1 to the row controller 220.

When the row controller 220 generates the second control signals on the basis of the plurality of digital signals corresponding to the plurality of pixel signals, the memory cell array 120 may generate a plurality of convolution signals in response to the second control signals, in operation S106. For example, the first memory cell MC00 may generate the first convolution signal AB0 in response to the first bit line control signal VL0 and the first word line control signal EN0. Although it is described as an example in the present embodiment that the second control signals are inputted only to the first memory cell MC00 of the first column among the plurality of memory cells, it is not necessarily limited thereto, and the second control signals may be simultaneously inputted to the memory cells, for example, MC00 and MC10, of the first column depending on the setting. When the second control signals are simultaneously inputted to the first and third memory cells MC00 and MC10, the first convolution signal AB0 may be obtained by performing matrix multiplication on a first current I1 generated by the first memory cell MC00 and a third current I3 generated by the third memory cell MC10. The matrix multiplication may be defined as in Equation 1 below, the first current I1 may be defined as in Equation 2 below, and the third current I3 may be defined as in Equation 3 below.

$$I_i = \sum W_{ij} V_i \qquad \text{[Equation 1]}$$

$$I_1 = W_{00} \times V_0 = \frac{1}{R_0} \times V_0 \qquad \text{[Equation 2]}$$

Herein, "$W_{00}$" may refer to the first weight stored in the first memory cell MC00, "$V_0$" may refer to the voltage level of the first bit line control signal VL0, and "$R_0$" may refer to a resistance value of the first resistive memory element R0 included in the first memory cell MC00.

$$I_3 = W_{10} \times V_1 = \frac{1}{R_2} \times V_1 \qquad \text{[Equation 3]}$$

Herein, "$W_{10}$" may refer to a third weight stored in the third memory cell MC10, "$V_1$" may refer to a voltage level of the second bit line control signal VL1, and "$R_2$" may refer to a resistance value of a third resistive memory element R2 included in the third memory cell MC10.

That is, the first weight and the third weight may be reflected in (i.e., applied to) the first convolution signal AB0. The first convolution signal AB0 may be outputted through the first column line CL0.

The signal converter 210 may convert the plurality of convolution signals into a plurality of digital signals in operation S108. For example, the signal converter 210 may convert the first convolution signal AB0 into the second digital signal DB0.

The operations S106 and S108 may be repeatedly performed by a predetermined number of times. That is, the second digital signal DB0 may be generated by the predetermined number of times according to the first convolution signal AB0 inputted by the predetermined number of times. The predetermined number of times may correspond to the bit depth of the first digital signal DA0, which is to be described in more detail with reference to FIG. 7.

The signal converter 210 may generate the first accumulation signal D0 on the basis of the second digital signal DB0. For example, the signal converter 210 may generate the first accumulation signal D0 by accumulating, that is, adding up the second digital signal DB0, which is inputted by the predetermined number of times, according to the predetermined scheme.

Figure 7:
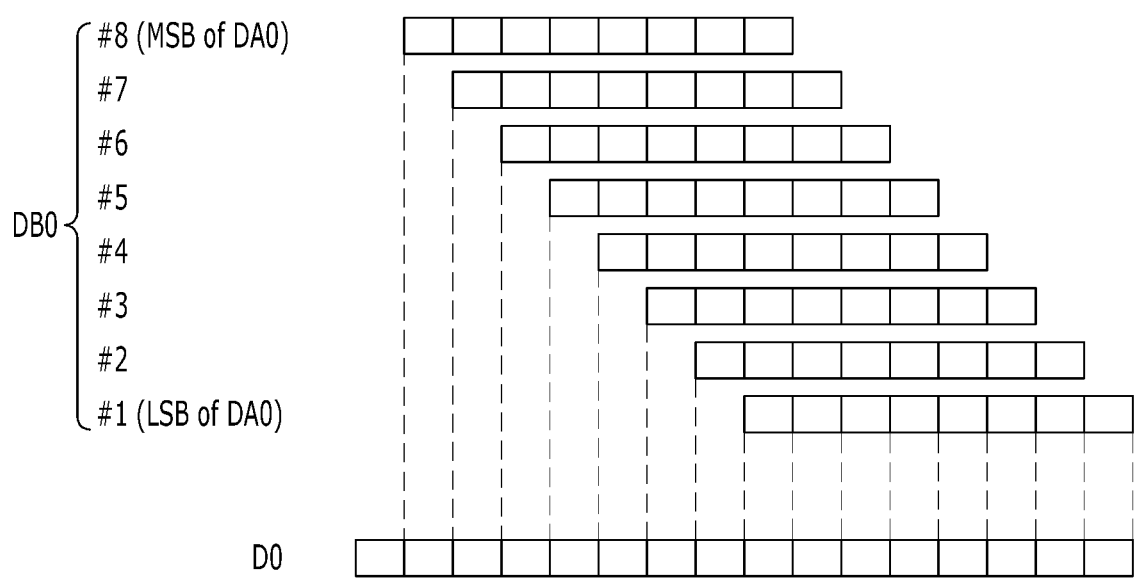
FIG. 7 is a diagram for describing in detail a process of generating a second digital signal illustrated in FIG. 6.

FIG. 7 is a diagram for describing in detail a process of generating the accumulation signal D0. For example, the bit depth of the first digital signal DA0 may have 8 bits in FIG. 7.

Referring to FIG. 7, the row controller 220 may generate the first bit line control signal VL0 on the basis of a first bit LSB among digital values of the first digital signal DA0. The memory cell array 120 may generate the first convolution signal AB0 in response to the first bit line control signal VL0. The signal converter 210 may generate a first signal (#1) as the second digital signal DB0 on the basis of the first convolution signal AB0. The first signal (#1) may correspond to the first bit LSB of the first digital signal DA0. The number of bits of the second digital signal DB0 may be 8 bits, the same as that of the first digital signal DA0.

The above processes of the row controller 220, the memory cell array 120 and the signal converter 210 may be sequentially and repeatedly performed from the first bit LSB to an eighth bit MSB among the digital values of the first digital signal DA0.

The signal converter 210 may generate the first accumulation signal D0 by accumulating the first signal (#1) to an eighth signal (#8). For example, the signal converter 210 may generate the first accumulation signal D0 by adding up the first signal (#1) to the eighth signal (#8) by digits, i.e., bits, in a state where the first signal (#1) to the eighth signal (#8) sequentially shift by one digit, i.e., one bit. Accordingly, the number of bits of the first accumulation signal D0 may be 16 bits.

According to an embodiment of the present disclosure, an analog operation may be performed when a weight is reflected in (i.e., applied to) a pixel signal.

According to an embodiment of the present disclosure, as matrix multiplication, which is a core operation of deep neural network (DNN), is performed as an analog operation through a plurality of memory cells, a ratio between performance and power consumption may be improved as compared with when the matrix multiplication is performed as a digital operation.

In addition, as a pixel array and a memory cell array are integrated, an occupied area may be reduced, and as some configurations used for processing signals generated by the pixel array and signals generated by the memory cell array are shared, the occupied area may be further reduced.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An image sensor comprising:
   a plurality of column lines;
   a plurality of pixels coupled to the plurality of column lines, and configured to output a plurality of pixel signals to the plurality of column lines in response to first control signals; and
   a plurality of memory cells coupled to the plurality of column lines, and configured to output a plurality of convolution signals, in which a plurality of data signals are reflected in the plurality of pixel signals, to the plurality of column lines in response to second control signals.

2. The image sensor of claim 1, further comprising:
   a signal converter coupled to the plurality of column lines, and configured to convert the plurality of pixel signals into a plurality of first digital signals and convert the plurality of convolution signals into a plurality of second digital signals; and
   a row controller configured to generate the first control signals and generate the second control signals based on the plurality of first digital signals.

3. The image sensor of claim 1, wherein the plurality of memory cells store the plurality of data signals.

4. The image sensor of claim 3, wherein each of the plurality of data signals includes a weight.

5. The image sensor of claim 1, wherein each of the plurality of memory cells includes a switch element and a resistive memory element.

6. The image sensor of claim 1, wherein neighboring first and second pixels among the plurality of pixels are configured in first and second regions, respectively, and a first memory cell adjacent to the first and second pixels among the plurality of memory cells is configured in a third region that is disposed to partially overlap with the first and second regions.

7. The image sensor of claim 1, wherein the plurality of memory cells write the plurality of data signals in response to the second control signals in a test mode.

8. An image sensor comprising:
   a first die including a pixel array and a memory cell array; and
   a second die stacked at a top or bottom of the first die, and configured to generate first control signals for controlling the pixel array and second control signals for controlling the memory cell array, and process a plurality of pixel signals generated by the pixel array and a plurality of convolution signals generated by the memory cell array; and wherein:
the pixel array and the memory cell array share a plurality of column lines,
the pixel array outputs the plurality of pixel signals to the plurality of column lines, and
the memory cell array outputs the plurality of convolution signals to the plurality of column lines.

9. The image sensor of claim 8, wherein the second die generates the second control signals based on a plurality of first digital signals corresponding to the plurality of pixel signals.

10. The image sensor of claim 8, wherein each of the first control signals, the second control signals, the plurality of pixel signals and the plurality of convolution signals is transmitted through a through-silicon via or hybrid bonding.

11. The image sensor of claim 8, wherein the first die includes:
the plurality of column lines;
the pixel array coupled to the plurality of column lines, and configured to output the plurality of pixel signals to the plurality of column lines in response to the first control signals; and
the memory cell array coupled to the plurality of column lines, and configured to output the plurality of convolution signals, in which a plurality of data signals are reflected in the plurality of pixel signals, to the plurality of column lines in response to the second control signals.

12. The image sensor of claim 11, wherein the memory cell array includes a plurality of memory cells for storing the plurality of data signals.

13. The image sensor of claim 12, wherein each of the plurality of memory cells includes a switch element and a resistive memory element.

14. The image sensor of claim 11, wherein the memory cell array writes the plurality of data signals in response to the second control signals in a test mode.

15. The image sensor of claim 11, wherein the second die includes:
a signal converter coupled to the plurality of column lines, and configured to convert the plurality of pixel signals into a plurality of first digital signals and convert the plurality of convolution signals into a plurality of second digital signals; and
a row controller configured to generate the first control signals and generating the second control signals based on the plurality of first digital signals.

16. An operation method of an image sensor, the operation method comprising:
reading out a plurality of pixel signals in response to first control signals;
converting the plurality of pixel signals into a plurality of first digital signals;
generating second control signals based on the plurality of first digital signals;
generating a plurality of convolution signals, in which a plurality of weights are reflected in the plurality of pixel signals, in response to the second control signals; and
converting the plurality of convolution signals into a plurality of second digital signals,
wherein the generating of the plurality of convolution signals comprises generating respective convolution signals based on signals outputted from memory cells arranged in at least one column.

17. The operation method of claim 16, wherein the generating of the plurality of convolution signals comprises performing matrix multiplication on the signals outputted from the memory cells arranged in the at least one column to generate the respective convolution signals.

18. The operation method of claim 16, wherein each of the plurality of convolution signals is an analog signal.

19. The operation method of claim 16, wherein the plurality of weights are written to a plurality of memory cells in response to the second control signals in a test mode.

* * * * *